(12) United States Patent
Al-Qasim et al.

(10) Patent No.: US 11,448,016 B2
(45) Date of Patent: Sep. 20, 2022

(54) CASING FRICTION REDUCTION METHODS AND TOOL

(71) Applicant: Saudi Arabian Oil Company, Dhahran (SA)

(72) Inventors: Abdulaziz Al-Qasim, Dhahran (SA); Mohammed Al-Arfaj, Dhahran (SA); Mohammad Saud Al-Badran, Dhahran (SA); Sunil Kokal, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 17 days.

(21) Appl. No.: 17/149,276

(22) Filed: Jan. 14, 2021

(65) Prior Publication Data

US 2021/0131196 A1 May 6, 2021

Related U.S. Application Data

(63) Continuation-in-part of application No. 15/888,743, filed on Feb. 5, 2018, now Pat. No. 10,920,502.

(51) Int. Cl.
*E21B 17/10* (2006.01)
*F16C 19/18* (2006.01)

(52) U.S. Cl.
CPC .......... *E21B 17/1057* (2013.01); *F16C 19/18* (2013.01)

(58) Field of Classification Search
CPC .. E21B 17/1057; F16C 19/18; F16C 33/3812; F16C 33/40; F16C 2352/00; F16C 29/046
See application file for complete search history.

(56) References Cited

U.S. PATENT DOCUMENTS

| 1,517,027 | A | * | 11/1924 | Smith | ................ | E21B 17/1057 |
| | | | | | | 166/241.3 |
| 1,801,294 | A | | 4/1931 | Sutton | | |
| 4,372,622 | A | * | 2/1983 | Cheek | ................ | F16C 29/0678 |
| | | | | | | 175/325.3 |
| 5,358,042 | A | * | 10/1994 | Stoltz | ................ | E21B 17/1057 |
| | | | | | | 166/241.6 |
| 5,692,563 | A | | 12/1997 | Krueger et al. | | |
| 5,715,898 | A | * | 2/1998 | Anderson | ........... | E21B 17/1057 |
| | | | | | | 175/323 |
| 5,833,018 | A | | 11/1998 | Von Gynz-Rekowski | | |
| 5,901,798 | A | | 5/1999 | Herrera et al. | | |
| 6,209,667 | B1 | | 4/2001 | Murray et al. | | |

(Continued)

FOREIGN PATENT DOCUMENTS

| CN | 201666126 U | 12/2010 |
| GB | 2362900 A | 12/2001 |
| WO | WO2014167315 A2 * | 10/2014 |

OTHER PUBLICATIONS

The International Search Report and Written Opinion for related PCT application PCT/US2019/016611 dated May 6, 2019. (SA5776).

*Primary Examiner* — Jonathan Malikasim
(74) *Attorney, Agent, or Firm* — Bracewell LLP; Constance G. Rhebergen; Linda L. Morgan

(57) ABSTRACT

Systems and methods for reducing friction between a casing string and a bore of a subterranean well when moving the casing string within the bore of a subterranean well include a roller bearing assembly. The roller bearing assembly has a bearing body and a plurality of spherical bearings spaced around an outer diameter of the bearing body. The bearing body is secured in line with the casing string.

19 Claims, 3 Drawing Sheets

(56) References Cited

U.S. PATENT DOCUMENTS

| | | |
|---|---|---|
| 6,382,333 B1 | 5/2002 | Murray |
| 6,453,999 B1 | 9/2002 | Reinholdt |
| 6,585,043 B1 | 7/2003 | Murray |
| 2002/0020526 A1 | 2/2002 | Male et al. |
| 2003/159834 A1 | 8/2003 | Kirk et al. |
| 2010/0276138 A1 | 11/2010 | Wittman et al. |
| 2012/0255744 A1 | 10/2012 | Shaikh et al. |
| 2013/0319684 A1* | 12/2013 | Moellendick ....... E21B 17/1057 166/241.6 |
| 2015/0136403 A1* | 5/2015 | Cheng ................ E21B 34/14 166/308.1 |
| 2016/0362944 A1 | 12/2016 | Harvey |

* cited by examiner

CASING FRICTION REDUCTION METHODS AND TOOL

CROSS REFERENCE TO RELATED APPLICATION

This application is a continuation in part of, and claims priority to and the benefit of, co-pending U.S. application Ser. No. 15/888,743, filed Feb. 5, 2018, titled "Casing Friction Reduction Methods and Tool," the full disclosure of which is hereby incorporated herein by reference in its entirety for all purposes.

BACKGROUND OF THE DISCLOSURE

1. Field of the Disclosure

The disclosure relates generally to hydrocarbon development operations in a subterranean well, and more particularly to moving tubular members within a subterranean well during hydrocarbon development operations.

2. Description of the Related Art

When moving a casing string into a subterranean well, contact between the casing string and the inner surface of the subterranean well can cause wear and damage to the casing string or can result in a stuck casing string. The casing string can be, for example, a casing string that extends from the surface into an open bore of the subterranean well, a casing string that extends from the surface within an outer diameter tubular member, such as an outer casing, or can be a liner that is suspended from an outer tubular member. A stuck pipe within a subterranean well is a cause of lost time during drilling and completion operations. Problems resulting from a stuck pipe can range from incidents causing an increase in costs to incidents where it takes days to get the pipe unstuck. In extreme cases where the problem cannot be resolved, the bore may have to be plugged and abandoned. In addition, contact between the casing string and the inner surface of the subterranean well even before the pipe becomes stuck can cause wear and damage to the casing string.

With the development of extended reach and more complex geometry wells, running a casing string to the required depth results in increased friction between the casing string and the wellbore compared to shorter or more straight wells. Friction between the casing string and the bore also increases as the inner diameter of the well decreases or as the number of dogleg intervals increases.

SUMMARY OF THE DISCLOSURE

Embodiments of this disclosure include systems and methods that have a roller bearing assembly that is integrated with a casing string that is moved through a bore of a subterranean well. The casing string and the roller bearing assembly each have a maximum outer diameter that is less than the inner diameter of the bore, and the roller bearing assembly has an inner diameter that circumscribes the casing string. The roller bearing assembly reduces friction forces that are generated from contact between the outer diameter surface of the casing string and the inner diameter surface of the bore. Systems and methods of this disclosure are particularly useful in reducing friction forces in deviated zones of the subterranean well and for reducing the risk of the tubular member sticking.

In an embodiment of this disclosure a system for reducing friction between a casing string and a bore of a subterranean well when moving the casing string within the bore of the subterranean well includes a roller bearing assembly. The roller bearing assembly includes a bearing body and a plurality of spherical bearings spaced around an outer diameter of the bearing body. The bearing body is secured in line with the casing string.

In alternate embodiments, a bearing maximum outer diameter of the roller bearing assembly can be no greater than a string maximum outer diameter of the casing string. The bore of the subterranean well can have an open bore with an irregular inner diameter surface. The casing string can be a liner string. The bore of the subterranean well can include an overall change in angle of more than seventy degrees over a length of the bore. Each of the plurality of spherical bearings can be secured to the bearing body such that each of the plurality of spherical bearings remains in a fixed location on the outer diameter of the bearing body. Each of the plurality of spherical bearings can be secured to the bearing body such that each of the plurality of spherical bearings is operable to rotate in any direction around a center of such spherical bearing. The subterranean well can have a pressure in a range of 5000 to 15000 pounds per square inch and a temperature in a range of 200 to 350 degrees Fahrenheit.

In an alternate embodiment of this disclosure, a method for reducing friction between a casing string and a bore of a subterranean well when moving the casing string within the bore of the subterranean well includes securing a roller bearing assembly in line with the casing string. The roller bearing assembly includes a bearing body and a plurality of spherical bearings spaced around an outer diameter of the bearing body.

In alternate embodiments, a bearing maximum outer diameter of the roller bearing assembly can be no greater than a string maximum outer diameter of the casing string. The casing string can be moved through the bore of the subterranean well, where the bore of the subterranean well includes an open bore with an irregular inner diameter surface. The casing string can be moved through the bore of the subterranean well and the casing string can be a liner string. The casing string through the bore of the subterranean well and the bore of the subterranean well can include an overall change in angle of more than seventy degrees over a length of the bore.

In other alternate embodiments, the plurality of spherical bearings can be secured to the bearing body such that each of the plurality of spherical bearings remains in a fixed location on the outer diameter of the bearing body. The plurality of spherical bearings can be secured to the bearing body such that each of the plurality of spherical bearings is operable to rotate in any direction around a center of such spherical bearing. The subterranean well can have a pressure in a range of 5000 to 15000 pounds per square inch and a temperature in a range of 200 to 350 degrees Fahrenheit.

In another alternate embodiment of this disclosure, a system for reducing friction between a casing string and a bore of a subterranean well when moving the casing string within the bore of the subterranean well has a roller bearing assembly. The roller bearing assembly includes a bearing body. A plurality of spherical bearings are spaced around an outer diameter of the bearing body. Each of the spherical bearings is secured within a sidewall of the bearing body by an individual plug threaded into an inner diameter surface of the bearing body.

In alternate embodiments, the bearing body can be sized to be removably attached to an outer diameter of the casing string and can be stationary relative to the casing string. Alternately, the bearing body can be secured in line with the casing string.

BRIEF DESCRIPTION OF THE DRAWINGS

So that the manner in which the previously-recited features, aspects and advantages of the embodiments of this disclosure, as well as others that will become apparent, are attained and can be understood in detail, a more particular description of the disclosure briefly summarized previously may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION OF THE DISCLOSURE

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
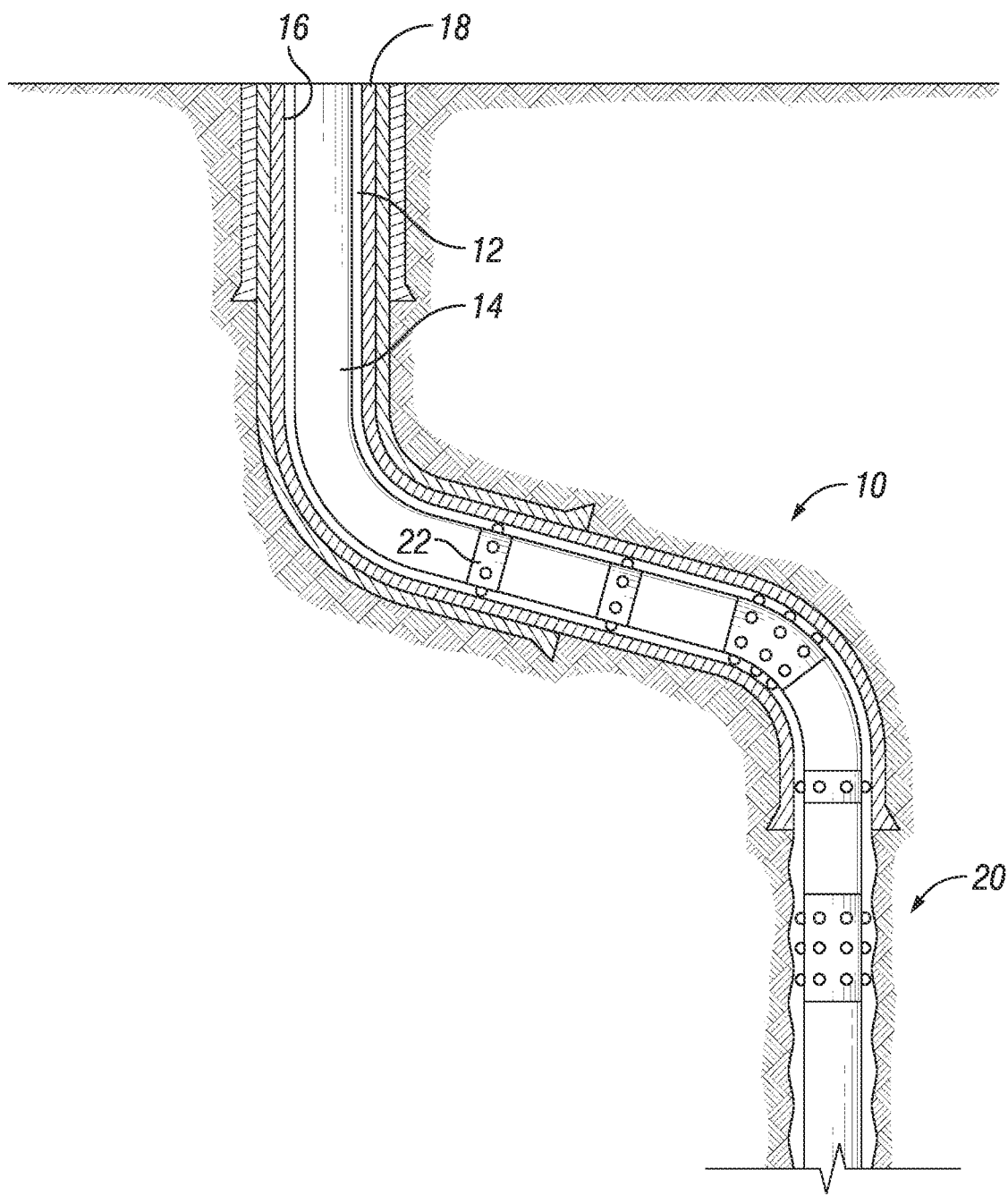
FIG. 1 is a schematic sectional representation of a subterranean well having a roller bearing assembly, in accordance with an embodiment of this disclosure.

Looking at FIG. 1, subterranean well 10 extends downwards from a surface of the earth, which can be a ground level surface or a subsea surface. Bore 12 of subterranean well 10 can include portions that extended generally vertically relative to the surface and can include portions that extend generally horizontally or in other directions that deviate from generally vertically from the surface. Bore 12 can, for example include doglegs that have a buildup rate in a range of five degrees to forty-five degrees per 100 feet. The buildup rate is the rate of change of the increasing angle of bore 12. Bore 12 can alternately, as an example have an overall change in angle of bore 12 of more than seventy degrees over the length of bore 12.

Subterranean well 10 can be a well associated with hydrocarbon development operations, such as a hydrocarbon production well, an injection well, or a water well. Subterranean well 10 can be, for example, a high pressure well with a pressure in a range of 5000 to 15000 pounds per square inch (psi), or a high temperature well with temperatures in a range of 200 to 350 degrees Fahrenheit (° F.), or can be a high pressure and high temperature well.

Casing string 14 extends into bore 12 of subterranean well 10. Casing string 14 can be, for example, a casing string that extends from the surface into an open bore of subterranean well 10, a casing string that extends from the surface within an outer casing 16, or can be a liner that is suspended from outer casing 16 and does not reach to the surface when suspended from outer casing 16. Casing string 14 can be formed of a series of joints that are secured end to end. As an example, casing string 14 can be formed of joints of tubular members that are threaded together.

Bore 12 can include an outer tubular member, such as outer casing 16, that is supported within subterranean well 10 with cement 18. In the sections of bore 12 with outer casing 16, the inner diameter surface of bore 12 is the inner diameter of outer casing 16. Bore 12 can also include an open borehole 20, which is an uncased section of bore 12. Open borehole 20 of bore 12 has an inner diameter surface that can be an irregular inner diameter surface of the subterranean formation that subterranean well 10 passes through. Open borehole 20 of bore 12 can be irregular both in diameter and in the shape of the inner diameter surface of bore 12.

Roller bearing assembly 22 can be removably attached to the outer diameter of casing string 14. Alternately, roller bearing assembly 22 can be secured in line with casing string 14. Roller bearing assembly 22 can reduce friction between casing string 14 and bore 12 of subterranean well 10 when moving casing string 14 within bore 12.

Figure 2:
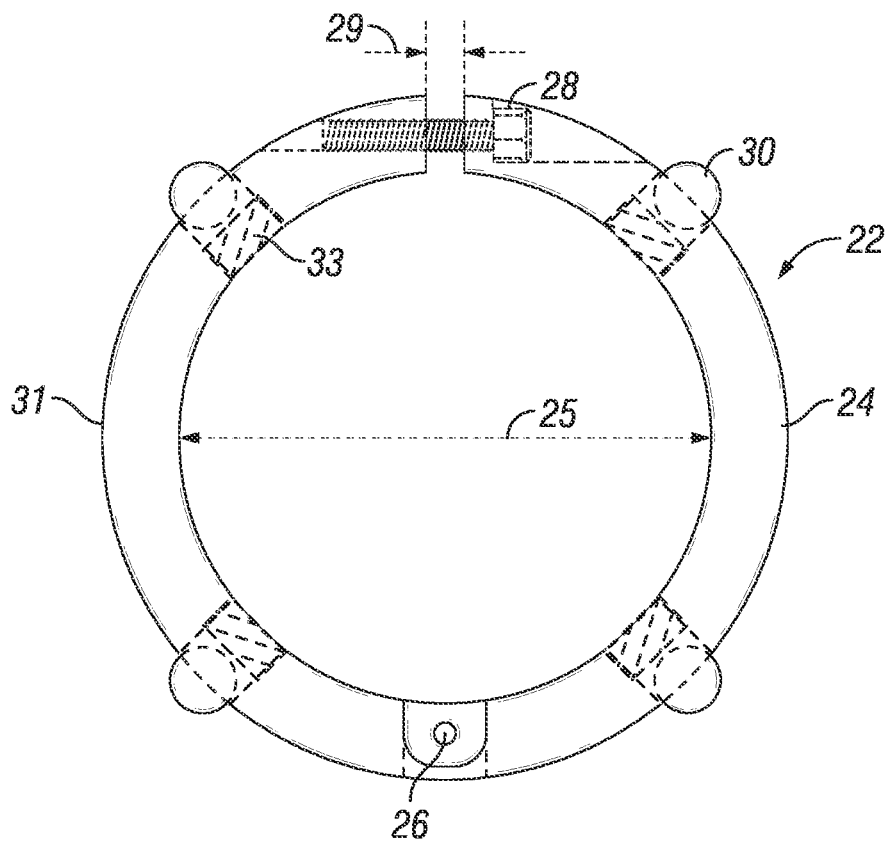
FIG. 2 is a plan view of a roller bearing assembly, in accordance with an embodiment of this disclosure.
Figure 3:
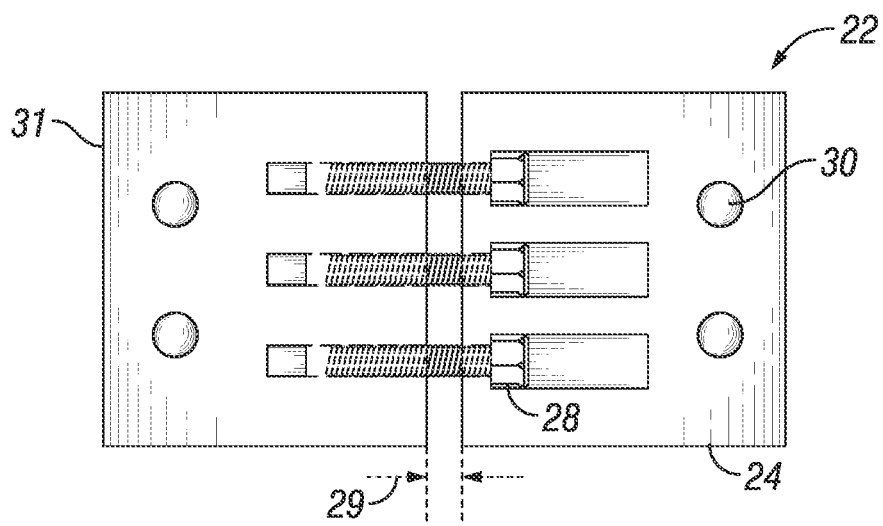
FIG. 3 is an elevation view of the roller bearing assembly of FIG. 2.

Looking at FIGS. 2-3, roller bearing assembly 22 has a bearing body 24. Bearing body 24 can be a ring shaped member that is formed of the same material used to form outer casing 16 or casing string 14. In alternate embodiments, bearing body 24 can be made of a softer material than casing string 14 since bearing body 24 is not required to withstand the same magnitude of pulling, tension, torque, collapse or burst forces as casing string 14. However, the material of bearing body 24 will be sufficiently strong to withstand the friction and side forces resulting from casing sting 14 contacting bore 12.

Bearing body 24 is sized with an inner diameter 25 that allows bearing body 24 to circumscribe casing string 14 and be secured to casing string 14 so that bearing body 24 is stationary relative to casing string 14. In the example embodiment of FIGS. 2-3, bearing body 24 is a jointed member with a pin 26 about which segments of bearing body 24 rotate. The segments of bearing body 24 can be attached opposite pin 26 with attachment member 28. In the example embodiment of Figurers 2-3, attachment member 28 is a bolt that extends through an end of one segment of bearing body 24 and into an end of another segment of bearing body 24. In alternate embodiments, attachment member 28 can be, for example, a ratchet device, or a male and female connector.

Attachment member 28 can be tightened so that an inner diameter surface of bearing body 24 grips an outer diameter surface of casing string 14 with sufficient force so that bearing body 24 is stationary relative to casing string 14 as casing string 14 is moved within bore 12 of subterranean well 10. In order to allow attachment member 28 to be tightened with sufficient force, there can be a gap 29 between opposing ends of adjacent segments of bearing body 24. In this way, such opposing ends of adjacent segments of bearing body 24 will not interfere with the tightening of attachment member 28. Having bearing body 24 secured to casing string 14 so that bearing body is integrated with casing string 14 and is stationary relative to casing string 14 as casing string 14 is moved within bore 12 reduces the risk of roller bearing assembly 22 itself being jammed or stuck in bore 12, or being disengaged from casing string 14 and left in bore 12 separate from casing string 14. Such risks are a concern, for example, when using commonly available centralizers and stabilizers which are external components and can sometimes be moveable relative to casing string 14.

Roller bearing assembly 22 further includes a plurality of spherical bearings 30 spaced around an outer diameter surface 31 of bearing body 24. Including bearings that are spherical in shape allows for spherical bearings 30 to move in multiple directions. Spherical bearing 30 can be formed of the same material used to form outer casing 16 or casing string 14.

Each of the plurality of spherical bearings 30 can be secured to bearing body 24 such the spherical bearing 30 remains in a fixed location on outer diameter surface 31 of bearing body 24. That is, spherical bearing 30 does not move circumferentially around the outer diameter of bearing body 24 or axially along a height of bearing body 24. Instead, spherical bearing 30 is secured to bearing body 24 such that the spherical bearing 30 is operable to rotate in any direction around a center of such spherical bearing 30.

Looking at FIG. 2, each spherical bearing 30 can be secured within a sidewall of bearing body 24 by an individual plug 33 threaded into an inner diameter surface of bearing body 24. When assembling roller bearing assembly 22, spherical bearing 30 can be located within a port that extends through the sidewall of bearing body 24 by inserting spherical bearing 30 into an opening of the port that is located along the inner diameter surface of bearing body 24. The opening of the port that is located along an outer diameter surface of bearing body 24 can have a reduced size so that such opening is too small for spherical bearing 30 to pass through.

Plug 33 can then be threaded or otherwise secured within the port by inserting the plug 33 into the opening of the port that is located along the inner diameter surface of bearing body 24. In this way spherical bearing 30 is trapped within the port between plug 33 and the inner diameter end of the port, and the opening of the port that is located along an outer diameter surface of bearing body 24 that is too small for spherical bearing 30 to pass through.

In the example of FIGS. 2-3, two rows of spherical bearings 30 are shown spaced axially apart, each row having four spherical bearings spaced around outer diameter surface 31 of bearing body 24. In alternate embodiments there can be one row or more than two rows of spherical bearings 30, and there can be more or less than four spherical bearings spaced around outer diameter surface 31 of bearing body 24 in each row. Because bearing body 24 is a generally solid ring shaped member, bearing body 24 can be designed with the number of rows of spherical bearings 30 and the number of spherical bearings 30 in each row as desired for a particular downhole subterranean well application. In alternate embodiments, spherical bearings 30 may not be in rows, but instead can be spaced in other patterns around outer diameter surface 31 of bearing body 24, such as in columns, in a spiral pattern, in patches, or be placed randomly around outer diameter surface 31 of bearing body 24. The number of spherical bearings 30 and the pattern of spherical bearings 30 can be optimized based on the size of bore 12 and the geometry of subterranean well 10.

The ability to select the layout of spherical bearings 30 around outer diameter surface 31 of bearing body 24 is an advantage over the use of centralizers or stabilizers where only a portion of an outer diameter of such external tools might be suitable for housing bearings, and thus there is no flexibility in the placement of such bearings.

Figure 4:
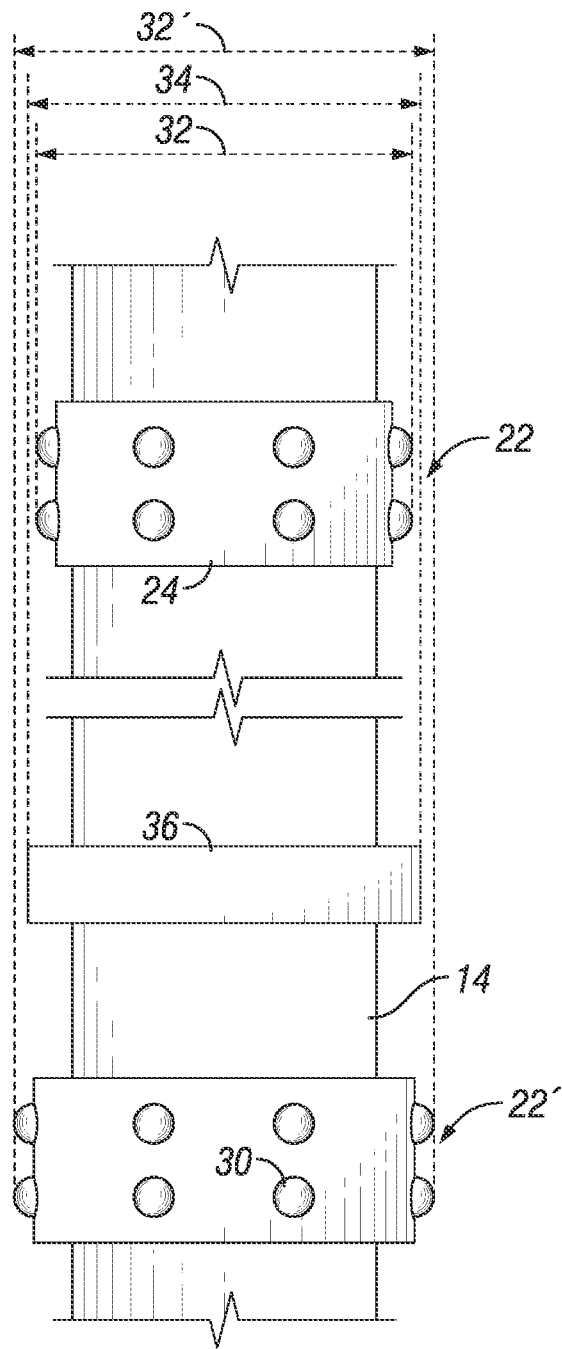
FIG. 4 is a schematic elevation view of the roller bearing assembly secured around a casing string, in accordance with an embodiment of this disclosure.

Although roller bearing assembly 22 has been shown in the example embodiments of FIGS. 2-3 as being removably attached to the outer diameter of casing string 14, in alternate embodiments, spherical bearings 30 can instead be located within the sidewall of bearing assembly 22 that is attached in line with casing string 14, as shown in FIG. 1 and FIG. 4.

In the embodiment of FIG. 1, when bearing assembly 22 is secured in line with the joints of casing string 14, roller bearing assembly 22 can have a similar inner diameter and outer diameter as casing string 14, with spherical bearings 30 extending radially outward from the sidewall of bearing assembly 22. In such an embodiment, bearing body 24 is a tubular member that can be formed of the same material as casing string 14 and that has ends with threads that can form threaded connections between joints of casing string 14.

In the alternate embodiment of FIG. 4, when bearing assembly 22 is secured in line with the joints of casing string 14, roller bearing assembly 22 can have a similar inner diameter as collar 36 of casing string 14, with spherical bearings 30 extending radially outward from the sidewall of bearing assembly 22. In such an embodiment, bearing body 24 is a tubular member that can be formed of the same material as casing string 14 and that has ends with threads that can form threaded connections between joints of casing string 14.

Looking at FIG. 4, roller bearing assembly 22 can be sized so that roller bearing assembly 22 does not increase the clearance requirement of casing string 14. As an example, a bearing maximum outer diameter 32 of roller bearing assembly 22 can be no greater than a string maximum outer diameter 34 of casing string 14. The string maximum outer diameter 34 of casing string 14 might be, for example, at collar 36 between joints of casing that make up casing string 14. Alternately, bearing maximum outer diameter 32' of roller bearing assembly 22' might be greater than string maximum outer diameter 34 of casing string 14, in particular where roller bearing assembly 22' is positioned proximate to the location of string maximum outer diameter 34 so that roller bearing assembly 22' can help to reduce friction and reduce the risk of a stuck pipe associated with string maximum outer diameter 34. However, bearing maximum outer diameter 32' can be selected to be only minimally greater than string maximum outer diameter 34 so that roller bearing assembly 22' does not increase the clearance requirement of casing string 14. As an example, the bearing maximum outer diameter 32 can be less than a maximum outer diameter of any centralizer.

When considering the force required (Fpushing) to move casing string 14 within bore 12, the follow Equation 1 can be applied:

$$F\text{pushing} = \Delta P \times A \times f \qquad \text{Equation 1:}$$

where ΔP is the pressure difference is between the inside of casing string 14 and the annulus outside of casing string 14 in psi, A is the cross sectional area of casing string 14 in inches squared, and f is the friction factor, which is dimensionless. This results in a value of Fpushing in pounds. Roller bearing assembly 22 can reduce friction factor f, which will in turn reduce the pushing force required to move casing string 14 within bore 12. In embodiments of this disclosure, friction factor f can be reduced by at least 50 percent.

Reducing the pushing force will avoid excessive pushing that could cause buckling or failure of casing string 14.

In an example of operation, in order to reduce friction between casing string 14 and bore 12 of subterranean well 10 when moving casing string 14 within bore 12, roller bearing assembly 22 can be removably attached to an outer diameter of casing string 14. Spherical bearings 30 which are spaced around outer diameter surface 31 of bearing body 24 can contact the inner diameter surface of bore 12 to reduce friction forces associated with contact between the outer diameter surface of casing string 14 and the inner diameter surface of bore 12.

Systems and methods of this disclosure can reduce the risk of casing string sticking in bore, which reduces the risk of increased costs and time associated with the need for remedial actions to unstick casing string. In addition, reducing friction between the outer diameter surface of casing string and the inner diameter surface of bore reduces the risk of buckling or failure of casing string that can be associated with the pushing forces required to move casing string within bore. Embodiments of this disclosure can be particularly useful in deviated zones of subterranean well. Roller bearing assembly can further act to maintain a distance between the outer diameter surface of casing string and the inner diameter surface of bore so that any cement later used around casing string can be more evenly distributed around casing string.

Embodiments of the disclosure described, therefore, are well adapted to carry out the objects and attain the ends and advantages mentioned, as well as others that are inherent. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A system for reducing friction between a casing string and a bore of a subterranean well when moving the casing string within the bore of the subterranean well, the system having:
 a roller bearing assembly including:
  a bearing body; and
  a plurality of spherical bearings spaced around an outer diameter of the bearing body, each of the spherical bearing located within a port that extends through a sidewall of bearing body and being secured within the sidewall of the bearing body by an individual plug threaded into an inner diameter surface of the bearing body, such that each of the spherical bearing extends radially outward from the outer diameter surface of the bearing body; where
 the bearing body is secured in line with the casing string, the casing string being positionable for cementing within the subterranean well.

2. The system of claim 1, where a bearing maximum outer diameter of the roller bearing assembly is no greater than a string maximum outer diameter of the casing string.

3. The system of claim 1, where the bore of the subterranean well is an open bore with an irregular inner diameter surface.

4. The system of claim 1, where the casing string is a liner string.

5. The system of claim 1, where the bore of the subterranean well includes an overall change in angle of the bore of more than seventy degrees over a length of the bore.

6. The system of claim 1, where each of the plurality of spherical bearings are secured to the bearing body such that each of the plurality of spherical bearings remains in a fixed location on the outer diameter of the bearing body.

7. The system of claim 1, where each of the plurality of spherical bearings are secured to the bearing body such that each of the plurality of spherical bearings is operable to rotate in any direction around a center of the spherical bearing.

8. The system of claim 1, where the subterranean well has a pressure in a range of 5000 to 15000 pounds per square inch and a temperature in a range of 200 to 350 degrees Fahrenheit.

9. A method for reducing friction between a casing string and a bore of a subterranean well when moving the casing string within the bore of the subterranean well, the method including:
 securing a roller bearing assembly in line with the casing string, where the roller bearing assembly includes:
  a bearing body; and
  a plurality of spherical bearings spaced around an outer diameter of the bearing body, each of the spherical bearings located within a port that extends through a sidewall of bearing body and secured within the sidewall of the bearing body by an individual plug threaded into an inner diameter surface of the bearing body, such that each of the spherical bearings extends radially outward from the outer diameter surface of the bearing body;
 moving the casing string through the bore of the subterranean well; and
 cementing the casing within the subterranean well.

10. The method of claim 9, where a bearing maximum outer diameter of the roller bearing assembly is no greater than a string maximum outer diameter of the casing string.

11. The method of claim 9, where the bore of the subterranean well includes an open bore with an irregular inner diameter surface.

12. The method of claim 9, where the casing string is a liner string.

13. The method of claim 9, where the bore of the subterranean well includes an overall change in angle of the bore of more than seventy degrees over a length of the bore.

14. The method of claim 9, further including securing the plurality of spherical bearings to the bearing body such that each of the plurality of spherical bearings remains in a fixed location on the outer diameter of the bearing body.

15. The method of claim 9, further including securing the plurality of spherical bearings to the bearing body such that each of the plurality of spherical bearings is operable to rotate in any direction around a center of the spherical bearing.

16. The method of claim 9, where the subterranean well has a pressure in a range of 5000 to 15000 pounds per square inch and a temperature in a range of 200 to 350 degrees Fahrenheit.

17. A system for reducing friction between a casing string and a bore of a subterranean well when moving the casing string within the bore of the subterranean well, the system having:
    a roller bearing assembly including:
        a bearing body; and
        a plurality of spherical bearings spaced around an outer diameter of the bearing body, each of the spherical bearings being located within a port that extends through a sidewall of bearing body and being secured within the sidewall of the bearing body by an individual plug threaded into an inner diameter surface of the bearing body, such that each of the spherical bearings extends radially outward from the outer diameter surface of the bearing body, where
    the casing string is positionable for cementing within the subterranean well.

18. The system of claim 17, where the bearing body is sized to be removably attached to an outer diameter of the casing string and stationary relative to the casing string.

19. The system of claim 17, where the bearing body is secured in line with the casing string.

* * * * *